US011998940B2

(12) United States Patent
Perinet et al.

(10) Patent No.: US 11,998,940 B2
(45) Date of Patent: Jun. 4, 2024

(54) BOWL FOR SPRAYING A COATING PRODUCT, ROTARY SPRAYING APPARATUS INCLUDING SUCH A BOWL, AND METHOD FOR CLEANING SUCH A SPRAYING APPARATUS

(71) Applicant: EXEL INDUSTRIES, Epernay (FR)

(72) Inventors: Sylvain Perinet, Paris (FR); Cyrille Medard, Paris (FR)

(73) Assignee: EXEL INDUSTRIES, Epernay (FR)

(*) Notice: Subject to any disclaimer, the term of this patent is extended or adjusted under 35 U.S.C. 154(b) by 307 days.

(21) Appl. No.: 17/290,133

(22) PCT Filed: Oct. 29, 2019

(86) PCT No.: PCT/EP2019/079555
§ 371 (c)(1),
(2) Date: Apr. 29, 2021

(87) PCT Pub. No.: WO2020/089242
PCT Pub. Date: May 7, 2020

(65) Prior Publication Data

US 2021/0394206 A1 Dec. 23, 2021

(30) Foreign Application Priority Data

Oct. 30, 2018 (FR) ....................................... 1860040

(51) Int. Cl.
*B05B 3/10* (2006.01)
*B05B 5/04* (2006.01)
*B05B 15/555* (2018.01)

(52) U.S. Cl.
CPC .......... *B05B 3/1014* (2013.01); *B05B 3/1092* (2013.01); *B05B 5/0407* (2013.01); *B05B 15/555* (2018.02); *B05B 3/1042* (2013.01)

(58) Field of Classification Search
CPC ... B05B 3/1014; B05B 15/555; B05B 3/1092; B05B 5/0407; B05B 3/1042
(Continued)

(56) References Cited

U.S. PATENT DOCUMENTS 5,106,025 A * 4/1992 Giroux .................. B05B 5/0426 239/112
5,707,009 A * 1/1998 Schneider ............. B05B 3/1064 239/223
(Continued)

FOREIGN PATENT DOCUMENTS

CN 105722599 A 6/2016
CN 106457278 A 2/2017
(Continued)

OTHER PUBLICATIONS

INPI Rapport de Recherche Préliminaire for Patent Application No. FR1860040, Jul. 5, 2019, 2 pp.
(Continued)

*Primary Examiner* — Joseph A Greenlund
*Assistant Examiner* — Kevin Edward Schwartz
(74) *Attorney, Agent, or Firm* — Soquel Group LLC

(57) ABSTRACT

A bowl for spraying a coating product, intended to be integrated into a rotary spraying apparatus for spraying a coating product. The spraying apparatus includes a turbine for rotating the bowl about an axis of rotation, and a body that defines the axis of rotation and includes shaping air ejection orifices arranged in a crown. The bowl includes a body which is centered in relation to an axis and which defines an inner radial surface for distributing the coating product to a spraying edge, as well as an outer radial surface. The outer radial surface of the bowl includes a deflector for at least partially directing a flow of cleaning product towards
(Continued)

the crown of the body, the cleaning product flowing along the outer radial surface towards the spraying edge.

13 Claims, 7 Drawing Sheets

(58) Field of Classification Search
USPC .............................................................. 239/7
See application file for complete search history.

(56) References Cited

U.S. PATENT DOCUMENTS

| | | | | |
|---|---|---|---|---|
| 5,813,708 | A | 9/1998 | Shen | |
| 6,050,499 | A * | 4/2000 | Takayama | B05B 15/55 239/296 |
| 6,341,734 | B1 | 1/2002 | Steur | |
| 6,569,258 | B2 | 5/2003 | Clifford et al. | |
| 6,578,779 | B2 | 6/2003 | Dion | |
| 6,854,665 | B1 * | 2/2005 | Di Gioia | B05B 5/0418 239/700 |
| 8,141,797 | B2 * | 3/2012 | Vetter | B05B 3/1014 239/230 |
| 8,827,181 | B2 * | 9/2014 | Nolte | B05B 5/0407 239/296 |
| 8,840,043 | B2 | 9/2014 | Nakazono et al. | |
| 8,851,397 | B1 * | 10/2014 | van der Steur | B05B 15/55 239/222.11 |
| 10,399,096 | B2 * | 9/2019 | Yamauchi | B05B 15/555 |
| 2004/0069877 | A1 * | 4/2004 | Schaupp | B05B 3/1064 239/700 |
| 2006/0138250 | A1 * | 6/2006 | Vetter | B05B 3/1014 239/255 |
| 2010/0143599 | A1 * | 6/2010 | Herre | B05B 3/1014 134/22.1 |
| 2010/0193602 | A1 | 8/2010 | Ballu et al. | |
| 2011/0000974 | A1 * | 1/2011 | Nolte | B05B 5/0426 239/3 |
| 2011/0086166 | A1 * | 4/2011 | Fischer | C23C 16/06 427/248.1 |
| 2012/0193453 | A1 * | 8/2012 | Nakazono | B05B 5/0426 239/461 |
| 2013/0206874 | A1 * | 8/2013 | Yamasaki | B05B 5/0426 239/704 |
| 2015/0140235 | A1 * | 5/2015 | Meier | B05B 3/1092 118/323 |
| 2016/0074885 | A1 * | 3/2016 | Prus | B05B 5/087 239/703 |
| 2017/0128969 | A1 | 5/2017 | Yamauchi | |
| 2018/0280999 | A1 * | 10/2018 | Seiz | B05B 5/0403 |

FOREIGN PATENT DOCUMENTS

| | | | |
|---|---|---|---|
| CN | 107206405 | A | 9/2017 |
| CN | 107921451 | A | 4/2018 |
| EP | 0715896 | A2 | 6/1996 |
| EP | 0785032 | A1 | 7/1997 |
| EP | 0878238 | A1 | 11/1998 |
| EP | 0951942 | A2 | 10/1999 |
| EP | 1426113 | A2 | 6/2004 |
| EP | 2464459 | A1 | 6/2012 |
| EP | 3046675 | A1 | 7/2016 |
| EP | 3281706 | A1 | 2/2018 |
| JP | H1099731 | A | 4/1998 |
| JP | H10156222 | A | 6/1998 |
| JP | 2002186883 | A | 7/2002 |
| JP | 2013000611 | A | 1/2013 |
| JP | 2014113562 | A | 6/2014 |

OTHER PUBLICATIONS

International Search Report for Patent Application No. PCT/EP2019/079555, dated Feb. 12, 2020, 2 pp.
EPO Abstract Translation for JP2002186883A.
EPO Translation for JP2002186883A, Oct. 14, 2019, 31 pp.
Translation for JP2013000611A, Jul. 25, 2019, 28 pp.
EPO Abstract Translation for JPH1099731A.
EPO Abstract Translation for JPH10099731A.

* cited by examiner

BOWL FOR SPRAYING A COATING PRODUCT, ROTARY SPRAYING APPARATUS INCLUDING SUCH A BOWL, AND METHOD FOR CLEANING SUCH A SPRAYING APPARATUS

CROSS-REFERENCE TO RELATED APPLICATIONS

This application claims benefit under 35 USC § 371 of PCT Application No. PCT/EP2019/079555 entitled BOWL FOR SPRAYING A COATING PRODUCT, ROTARY SPRAYING APPARATUS INCLUDING SUCH A BOWL, AND METHOD FOR CLEANING SUCH A SPRAYING APPARATUS, filed on Oct. 39, 2019 by inventors Sylvain Perinet and Cyrille Medard. PCT Application No. PCT/EP2019/079555 claims priority of French Patent Application No. 18 60040, filed on Oct. 30, 2018.

FIELD OF THE INVENTION

The invention relates to a bowl for spraying a coating product, to a rotary spraying apparatus including such a bowl, as well as to a method for cleaning such a spraying apparatus.

BACKGROUND OF THE INVENTION

In the field of electrostatic or purely pneumatic spraying a coating product, it is known that a bowl of a rotary sprayer can be set in rotation and supplied with coating product to an extent that droplets of coating product are released from a spraying edge of this bowl and form a cloud from this edge which can be directed towards an object to be coated, such as, for example, a motor vehicle body. With this type of equipment, it is known to use a droplet cloud-guiding air flow, commonly called skirt air or shaping air, in order to direct or shape the droplet cloud towards the object to be coated.

In this kind of application, it is necessary to clean the sprayer regularly, especially when changing the coating product, for example to adapt it to the color intended for a vehicle.

This problem is not limited to vehicle coating systems. It also concerns coating plants for other industrial products.

In this context, it is known to use three distinct rinsing systems, each with a dedicated cleaning product supply system, these three systems comprising an injector channel and, possibly, a rinsing ring for the inner radial surface of the bowl, a rinsing channel for the outside of the bowl and, finally, an outer rinsing box designed to clean a front face of the body of the spraying apparatus into which the air ejection orifices for shaping the droplet cloud open.

Such a rinsing box is complex to design and manufacture. Its use increases the coating product changeover time, as well as the operating cost of a coating product spraying installation since this rinsing box must be installed, supplied with cleaning product and maintained in a specific way.

Different techniques have been considered for cleaning inner and outer parts of a bowl of a rotary coating product sprayer, as is apparent from EP-A-0 715 896, EP-A-0 951 942, EP-A-1,426,113, U.S. Pat. No. 6,578,779, EP-A-2,464,459, EP-A-0,878,238, U.S. Pat. Nos. 6,569,258, 6,341,734, EP-A-3,046,675, EP-A-0,785,032, U.S. Pat. Nos. 5,813,708, 8,840,043, JP-A-2013,000611, JP-A-H10,99731, and JP-A-2002,186883. These documents are not concerned with rinsing the front face of the spraying apparatus body, into which the guiding air ejection ports open.

U.S. Pat. No. 6,569,258 proposes cleaning guide air ejection orifices by feeding a solvent through the orifices themselves. The cleaning is effective, but this approach induces a high drying time for the multiple small supply channels of these air ejection orifices. Indeed, at the end of the cleaning operation, these channels must be carefully dried to ensure that no drops of cleaning product are sprayed onto an object being coated, which would impair the quality of the application.

In contrast, the bowl of the first embodiment of US-A-2017/128969 comprises a shoulder arranged at the outlet of a cleaning channel, which has the effect of directing a cleaning product, radially to the axis of rotation, towards an inner surface of a body of a spraying apparatus in which this bowl is mounted, and then towards the front of the spraying apparatus. The bowl of the second embodiment comprises a radial outer surface that is cylindrical at the rear and frustoconical at the front. The coating product is guided, by the junction between these cylindrical and frustoconical surfaces, to assume a frustoconical shape and flow forward. These different bowls do not allow for cleaning a crown of the sprayer body in which the air ejection orifices open. This crown must therefore be cleaned by specific means.

SUMMARY OF THE INVENTION

The invention intends to remedy these problems more particularly by proposing a new bowl for a rotary spraying apparatus, for spraying a coating product, that facilitates cleaning this sprayer to the extent that this cleaning can be implemented in a manner which is both effective and rapid, without the use of additional equipment, such as a rinsing box.

To this end, the invention relates to a bowl for spraying a coating product intended to be integrated into a rotary coating product spraying apparatus, said spraying apparatus comprising a turbine for rotating the bowl in rotation about an axis of rotation and a body which defines the axis of rotation and which comprises shaping air ejection orifices arranged in a crown, the bowl comprising a body centered on an axis and which defines an inner radial surface for distributing the coating product up to a spraying edge, as well as an outer radial surface. According to the invention, the outer radial surface of the bowl is arranged with a deflector provided for at least partially directing, towards the crown of the body, flowing along the outer radial surface, towards the spraying edge.

Thanks to the invention, the deflector makes it possible to return cleaning product to the crown of the body into which the air ejection orifices open, which makes it possible to clean this crown of any coating product deposits that have formed there, in a particularly simple, rapid and effective manner. Thus, the front face of a spraying apparatus equipped with a bowl in accordance with the invention can be cleaned effectively.

According to advantageous but non-mandatory aspects of the invention, such a spraying apparatus may incorporate one or more of the following features:

- The deflector forms an angular break area of the outer radial surface.
- The deflector defines, in a plane radial to the axis of rotation and with the outer radial surface upstream of the deflector, a dihedral at an angle at the apex of between 10° and 170°, preferably between 45° and 135°.

The deflector is located along the outer radial surface at a non-zero distance from the spraying edge, this distance preferably being greater than 5 mm, more preferably greater than 10 mm.

The deflector is equipped with channels for guiding the flow of cleaning product towards the crown.

The channels are formed through the deflector.

In a variant, the channels are notches arranged on a surface of the deflector.

The channels are inclined in an ortho-radial direction with respect to the axis of rotation.

The deflector is integral with the bowl.

In a variant, the deflector is a member attached to the outer radial surface of the bowl, in particular by welding, gluing, additive manufacturing or screwing.

According to another aspect, the invention relates to a rotary coating product spraying apparatus comprising a bowl rotating about an axis of rotation, a turbine for rotating the bowl in rotation about the axis of rotation, a body that defines the axis of rotation and comprises orifices for ejecting air shaped like a cloud of droplets of coating product discharged from the spraying edge of the bowl, these orifices being arranged on a ring of the body. In accordance with the invention, the bowl is as mentioned above.

Advantageously, it may be arranged that:

The deflector is located, along the axis of rotation and in the direction of flow of the coating product towards the edge of the bowl, upstream of the orthogonal projection of the crown on the axis of rotation.

The deflector is located, along the axis of rotation and in the direction of flow of the coating product towards the edge of the bowl, downstream of the orthogonal projection of the crown on the axis of rotation.

The crown forms the front face of the body and is perpendicular overall to the axis of rotation.

According to a third aspect, the invention relates to a method of cleaning a rotating coating product spraying apparatus as mentioned above, which method comprises at least steps of:

(a) directing a flow of cleaning product to the outer radial surface of the bowl while the bowl is rotating; and b) allowing the cleaning product to flow at least up to the level of the deflector and, at least partially, towards the crown of the body of this spraying apparatus.

Advantageously, step b) comprises two sub-steps, b1) and b2), namely:

a first sub-step b1) during which the ejection orifices are not supplied with pressurized air; and a second sub-step b2) in which the ejection orifices are supplied with pressurized air.

BRIEF DESCRIPTION OF THE DRAWINGS

The invention will be better understood and other advantages thereof will become clearer in the light of the following description of several embodiments of a rotary coating product spraying apparatus in accordance with its principle, which incorporates a bowl in accordance with the invention, and of a method of cleaning such a spraying apparatus, given by way of example only and made with reference to the appended drawings in which.

DETAILED DESCRIPTION OF EMBODIMENTS

Figure 1:
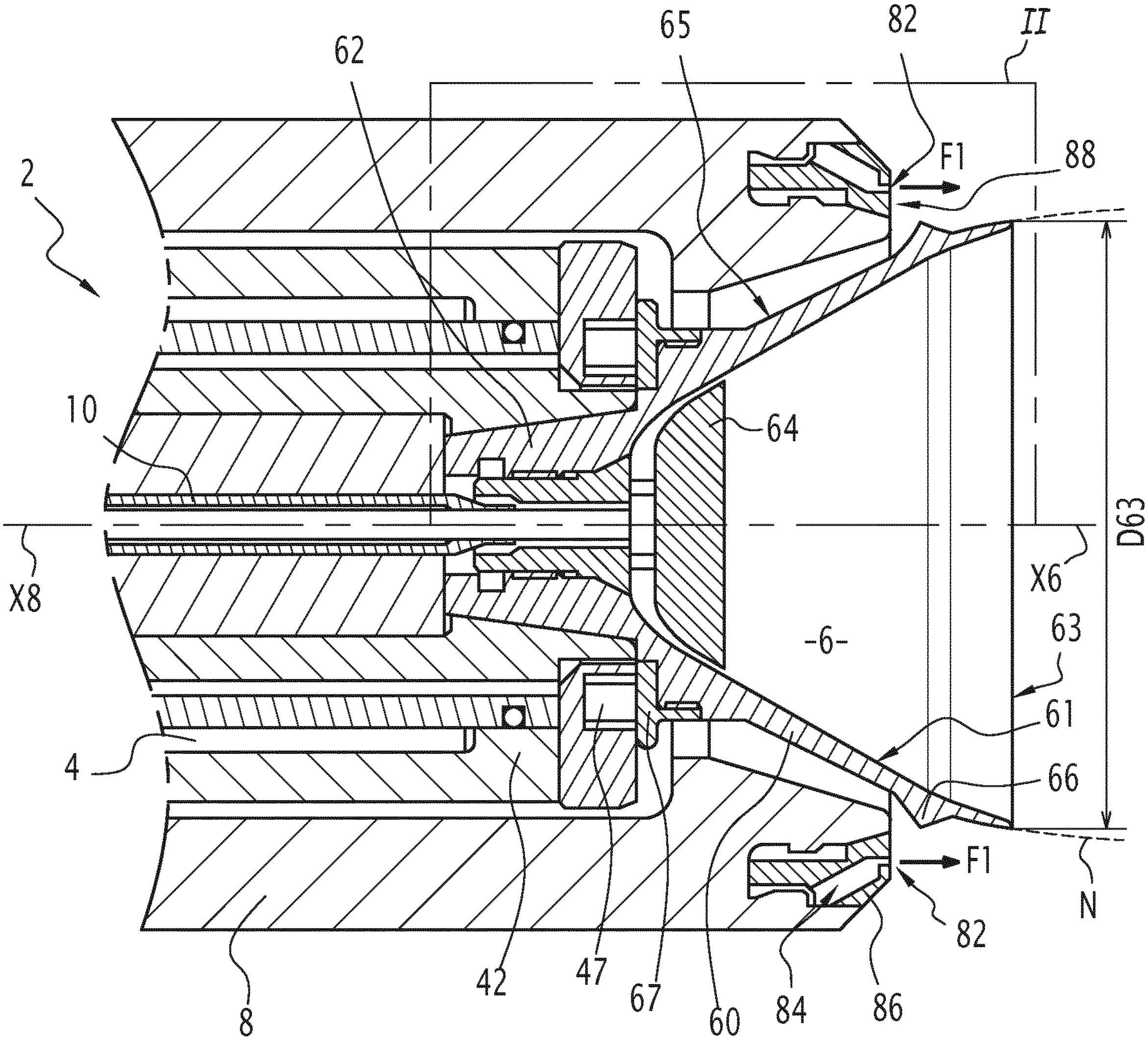
FIG. 1 is a principle partial longitudinal section of a coating spraying apparatus according to a first embodiment of the invention, incorporating a bowl according to the invention.

The spraying apparatus 2, a front part of which is shown in cross-section in FIGS. 1 to 5, comprises a turbine 4 for rotating a bowl 6 in rotation about an axis X8 defined by a body 8 of the spraying apparatus 2.

The spraying apparatus 2 can be of the electrostatic or non-electrostatic type.

The bowl 6 is supplied with coating product by an axial conduit 10 centered on the axis X8 and which opens into a hub 62 of the bowl 6. The bowl comprises a one-piece body 60 that defines an inner radial surface 61 and an outer radial surface 65, relative to a central axis X6 of this bowl, which is coincident with axis X8 when the bowl 6 is mounted on the turbine 4. The bowl 6 is equipped with a distributor 64 which makes it possible to return the coating product coming from the duct 10 in the direction of the inner radial surface 61 on which this product is distributed and whose downstream end constitutes a spraying edge 63 of a cloud N of droplets of coating product, during operation of the spraying apparatus 2. The function of the surface 61 is to distribute the coating product coming from the conduit 10 evenly and with decreasing thickness along the axis X8, approaching the spraying edge 63.

Along axis the X6, the surface 65 also extends to the edge 63.

The surfaces 61 and 65 and the edge 63 are centered on the axis X6.

The diameter of the spraying edge 63 is noted as D63.

In this description, upstream corresponds to a direction facing the source of the coating or cleaning product on the left of FIGS. 1 through 7, while downstream corresponds to an opposite direction facing the spraying edge 63 on the right of these Figures.

The rotational connection between the rotor 42 of the turbine 4 and the bowl 6 can take place by magnetic attraction, in particular by means of a magnet 47 integrated into this rotor and a ferromagnetic ring 67 integrated into the bowl 6, at the level of its outer radial surface 65. In a variant, other means of securing the rotor 42 to the bowl 6 against rotation can be used, for example, means of securing by screwing.

The body 8 is arranged with skirt air ejection orifices 82 intended to guide or shape the cloud N of coating product droplets leaving the edge 63 in the direction of an object to be coated, not shown. In FIG. 1, the air jets leaving the orifices 82 are shown by the arrows F1. In practice, the orifices 82 are evenly distributed around the axis X8, with an angular spacing of between 2° and 15°.

The orifices 82 are supplied with pressurized air conduits 84 arranged in a part 86 of the body 2, which is usually called a "skirt".

The orifices 82 open onto an annular surface of the body 2 which forms a ring 88 surrounding the axis X8 and the bowl 6 when the latter is mounted in the spraying apparatus 2. The ring 88 forms the front face of the body 8, that is, its end face oriented towards the object to be coated during operation of the spraying apparatus 2.

The crown 88 is perpendicular overall to the axis X8, that is, in a plane radial to the axis X8 such as that of the figures, it forms an angle of between 80° and 100° with the axis X8.

The problem that the present invention particularly solves relates to the cleaning of this crown 88, more particularly when changing the coating product.

A deflector 66 is arranged on the outer radial surface 65 of the bowl 6, said deflector 66 being arranged to deflect, that is, to direct, toward the crown 88 at least a portion of a flow of cleaning product that flows over the surface 65.

In the example of FIGS. 1 to 5, the deflector 66 is integral with the bowl 6 and can be made by machining the outer radial surface 65. In a variant, this deflector is attached to the body 60 by welding, gluing, additive manufacturing, screwing or any other suitable mechanical assembly means.

The deflector extends continuously around the entire periphery of the outer radial surface 65, that is, all around the body 60.

The deflector 66 forms an angular break area in the outer radial surface 65, that is, an area in which this surface changes orientation, abruptly, with respect to the axis X6.

Figure 2:
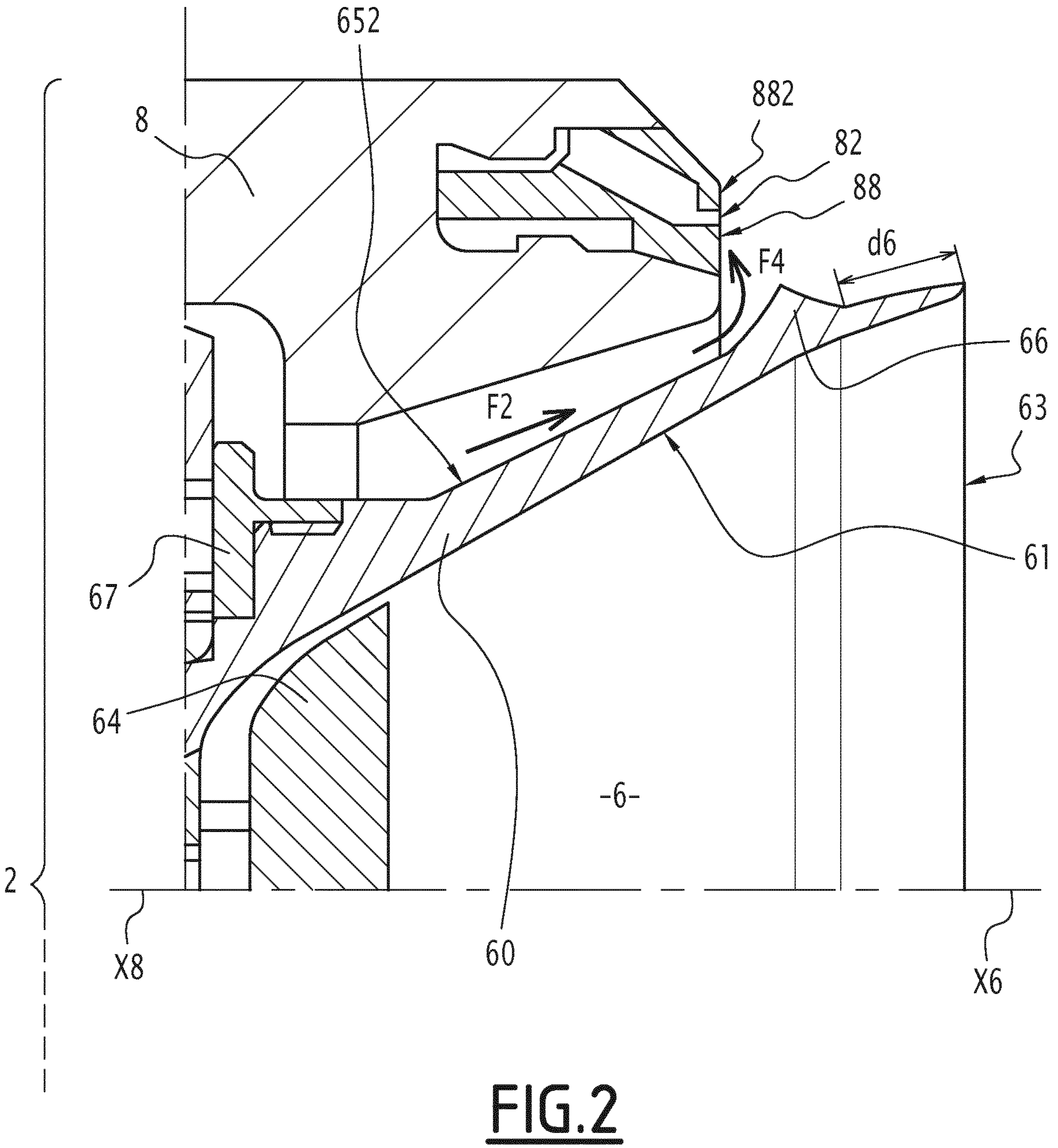
FIG. 2 is a larger scale detailed view of III in FIG. 1, during a first cleaning step of this spraying apparatus.

Thus, when it is appropriate to clean the radial outer surface 65 of the bowl 6, a quantity of cleaning product may be directed toward that surface, as represented by the arrows F2 in FIG. 2. The flow of cleaning product thus created spreads over the surface 65, progressing towards the edge 63, until it encounters the deflector 66, which modifies its flow direction by returning it towards the crown 88, which is represented by the arrows F4 in FIG. 2.

The portions of the outer radial surface 65 located upstream and downstream of the deflector 66, in the direction of flow of the cleaning product towards the edge 63, are noted 652 and 654 respectively. The downstream portion 654 is positioned between the deflector 66 and the spraying edge 63, along the axis X6. The length of this portion 654, measured parallel to this surface in a plane radial to axis X6, is noted as d6. This length corresponds to the distance between the deflector 66 and the edge 63. This distance is measured between the downstream end of the deflector 66 and the edge 63. This distance is non-zero, preferably greater than or equal to 5 mm, more preferably greater than 10 mm.

Placing the deflector 66 on the surface 65, more particularly in an intermediate area close to the crown 88, makes it possible to use the liquid product intended for cleaning the surface 65 to also clean the annular surface formed by the crown 88.

Thus, the cleaning of the spraying apparatus 2, in addition to the conventional steps of cleaning the inner radial surface 61 by injecting cleaning product via the conduit 10, comprises a first step represented by the arrows F2 and consisting of directing the flow of cleaning product towards the upstream portion 652 of the outer radial surface 65 of the bowl 6, while the latter is driven in rotation by the turbine 4, about the axes X6 and X8 together. This first step is already known for certain spraying apparatus in which the outer radial surface of the bowl is cleaned. This method comprises an additional step during which the cleaning product is allowed to flow over the portion 652 up to the level of the deflector 66, to the point that it is then deflected or redirected towards the crown 88, which is represented by the arrows F4.

Figure 3:
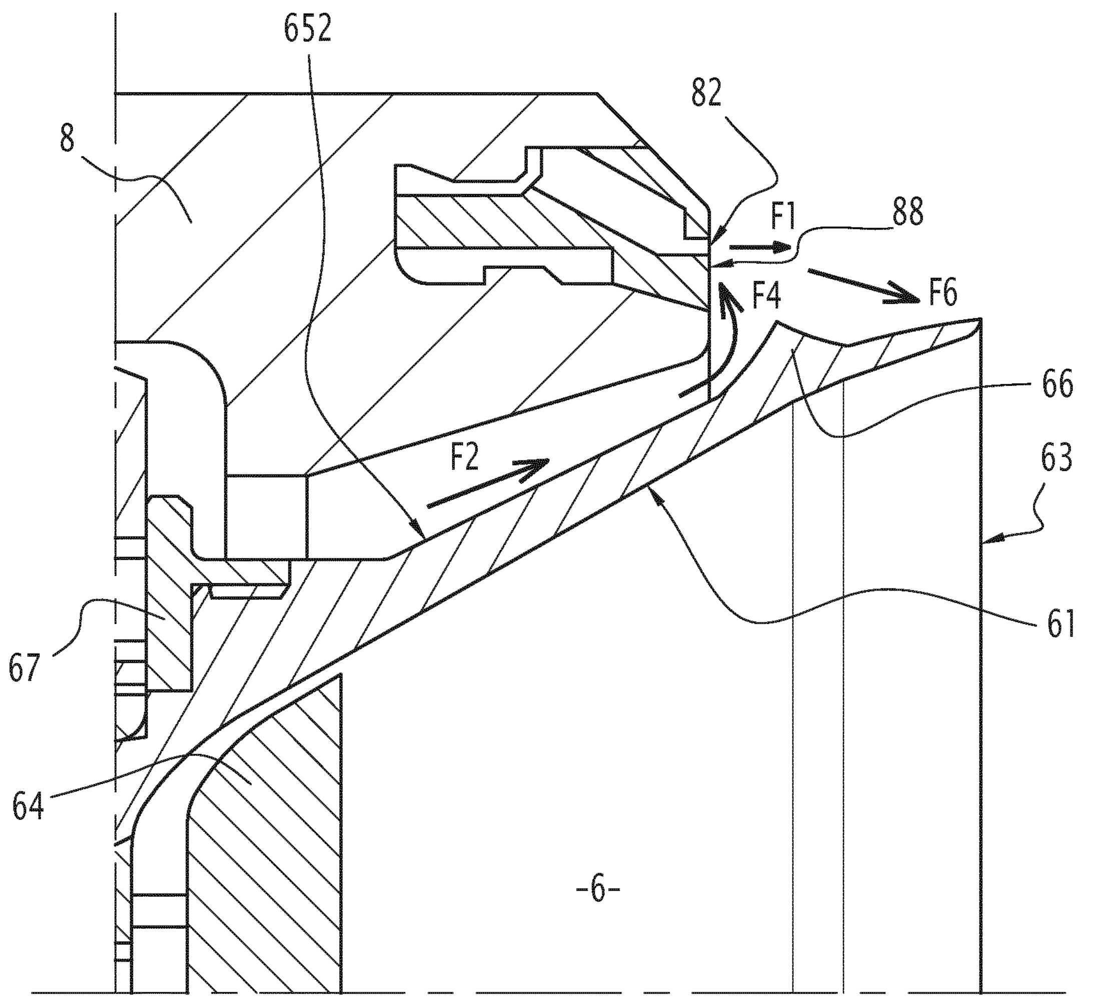
FIG. 3 is a detailed view similar to FIG. 2 during a second cleaning step.

This second step is advantageously broken down into two sub-steps shown in FIGS. 2 and 3 respectively.

In the first sub-step, the orifices 82 are not supplied with pressurized air. This allows the flow of cleaning product diverted by the deflector 66 to effectively clean the entire ring 88, including the portion 882 of that ring located radially outward of the orifices 82.

In the second sub-step shown in FIG. 3, pressurized air is supplied to the orifices 82 to the extent that pressurized air jets leave the orifices 82, as shown by arrow F1, thereby diverting the flow of cleaning product toward the downstream portion 654 of the surface 65, as shown by arrow F6.

Thus, complete cleaning of the surface 65 can be achieved both upstream of the deflector 66 on the surface portion 652 and downstream thereof on the surface portion 654.

Figure 4:
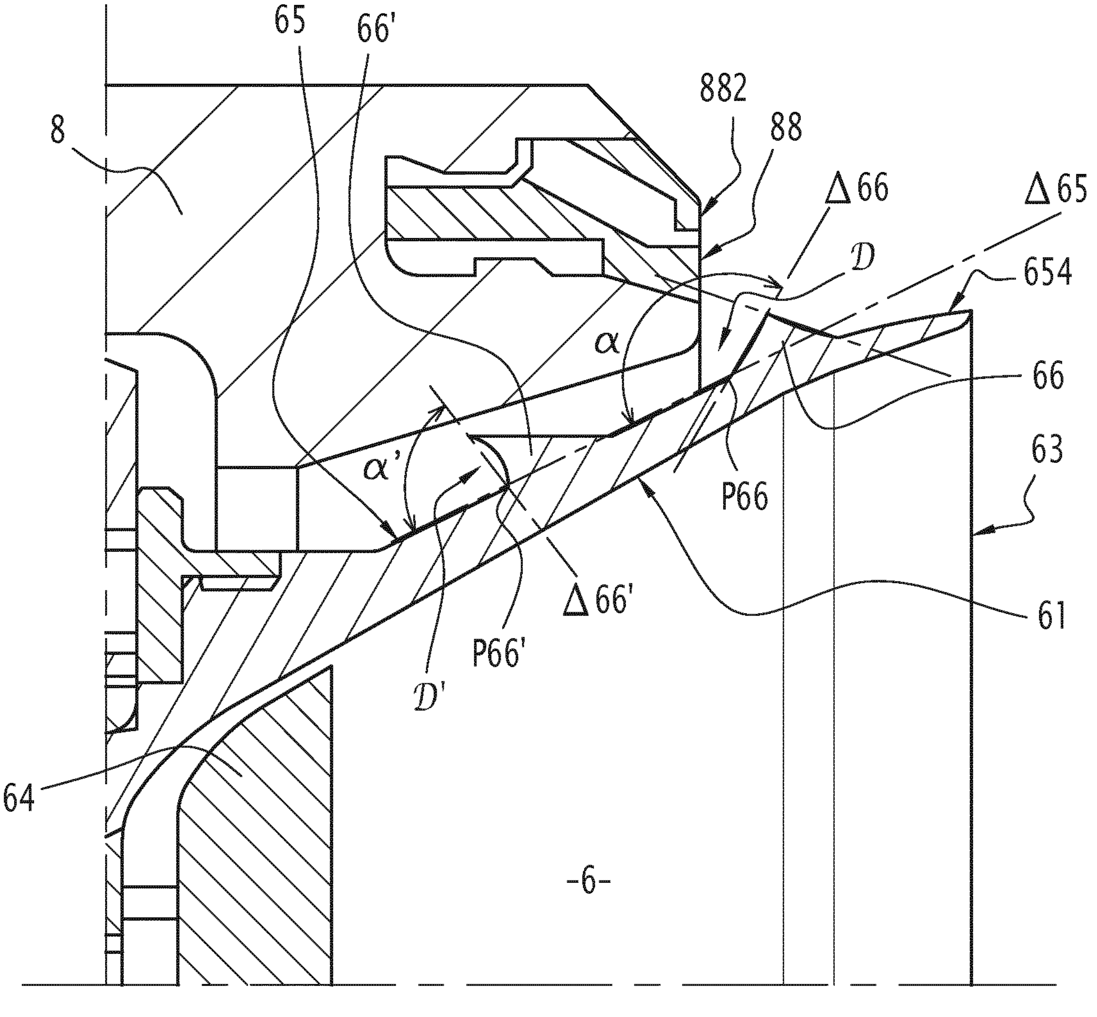
FIG. 4 is a detailed view similar to FIG. 2 enabling identification of some geometrical aspects of the invention.

As is more particularly apparent from FIG. 4, the deflector 66 is positioned, axially along the axis X8, downstream of the projection P88 of the surface 88 on that axis. In other words, the deflector 66 is positioned downstream of the orifices 82, along the axis X8.

In a variant, and as shown in mixed lines in FIG. 4, with the deflector 66', this can be positioned upstream of the orifices 82.

According to another variant, which is not shown, the deflector 86 can be aligned, along the axis X8, with the orifices 82.

In radial cross-section, the deflector 66 has a generally triangular shape, with two slightly concave surfaces, as visible in FIG. 3.

The upstream and downstream surfaces of the deflector 6 are noted as 662 and 664 respectively, that is, the surfaces facing the surface portion 652 and the surface portion 654, that is, the turbine 4 and the spraying edge 63 respectively, in the mounted configuration of the bowl 6 in the spraying apparatus 2.

Δ65 is noted as a straight-line tangent to the surface 65 upstream of the deflector 66 in a plane radial to the axis X6, which is that of FIG. 4. Moreover, Δ66 is noted as a straight line passing, in the same plane, through the base and through the apex of the surface 662, the base being the junction between the surface 65 and the deflector 66, on the upstream side of this deflector, and the apex being the outer radial edge of the deflector 66. The straight line Δ66 represents the average orientation of the surface 662 in the plane of FIG. 4.

The straight lines Δ65 and Δ66 define, in the plane of FIG. 3, a dihedral D whose angle at the apex is noted as α.

This angle has a value of about 135°.

In a variant, and as shown in mixed lines for the alternative embodiment schematized in FIG. 4, the dihedral D' formed by straight lines Δ65 and Δ66' may have an acute apex angle α', that is, less than 90°.

In practice, the apex angle α or α' of the dihedral D or D' defined between the upstream surface 662 of the deflector 6 and the outer radial surface 65 upstream of this deflector has a value between 10° and 170°, preferably between 45° and 135°.

P66 is noted as the point of junction between the straight lines Δ65 and Δ66 defined above. For the alternative embodiment shown on the left of FIG. 4, a point of intersection P66' between the straight lines Δ65 and Δ66' can be defined in the same way. The point P66 or P66' represents, in the plane of FIG. 4, a line in the form of a circle from which the deflector 66 or 66' acts on the flow of the cleaning product. The deflector 66 or 66' is considered to be upstream or downstream of the crown 88 depending on the position of this point P66 or P66' with respect to the orthogonal projection P88 of the crown 88 on the axis X8.

Figure 5:
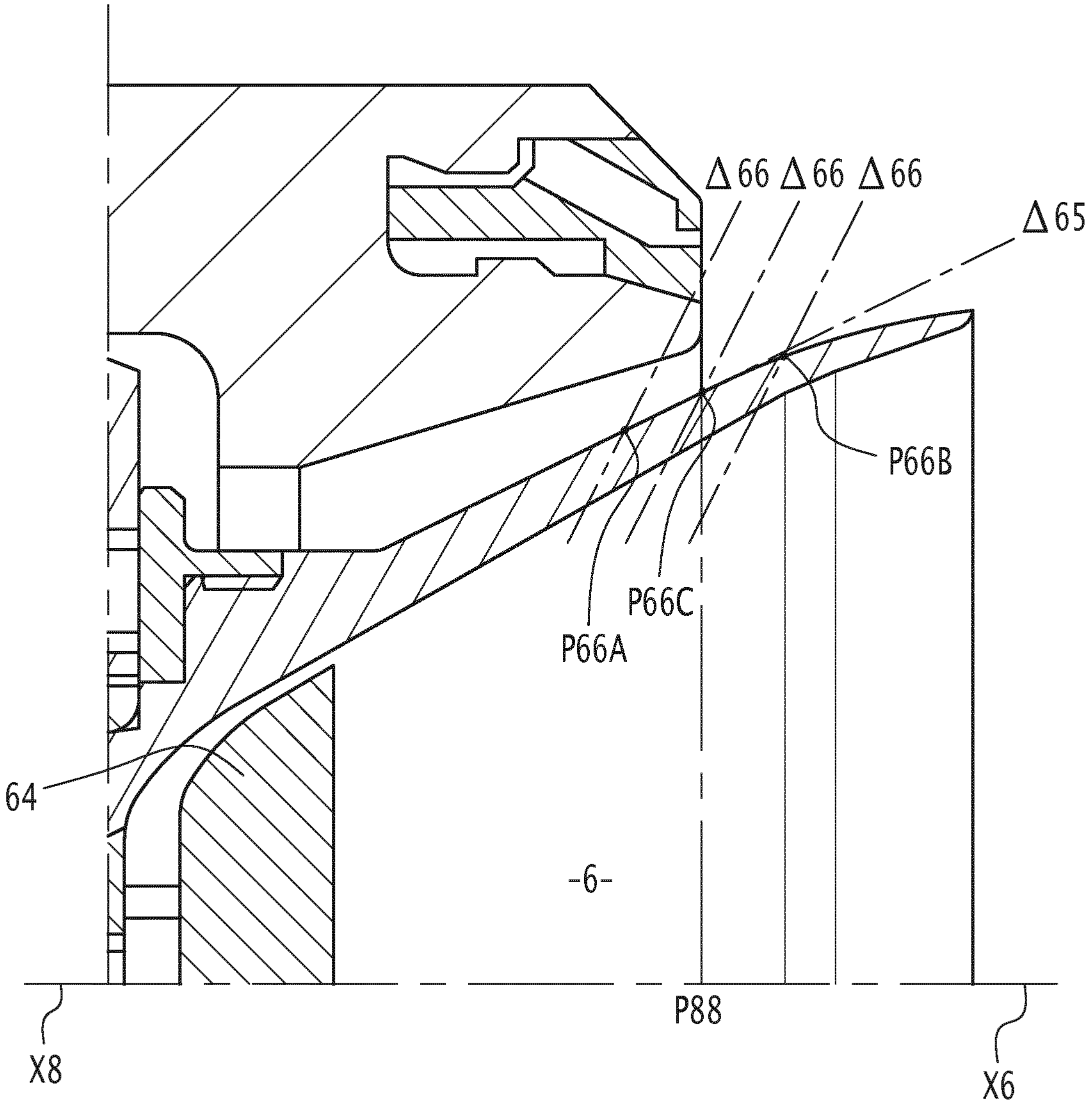
FIG. 5 is a view similar to FIG. 2, but on a smaller scale, allowing enabling identification of other geometrical aspects of the invention.

As shown in FIG. 5, this point P66 may be located, along the axis X8, either upstream, like the point P66A, or downstream, like the point P66B, or at the same level, like the point P66C as the orthogonal projection P88 of the crown 88 on this axis X8.

Figure 6:
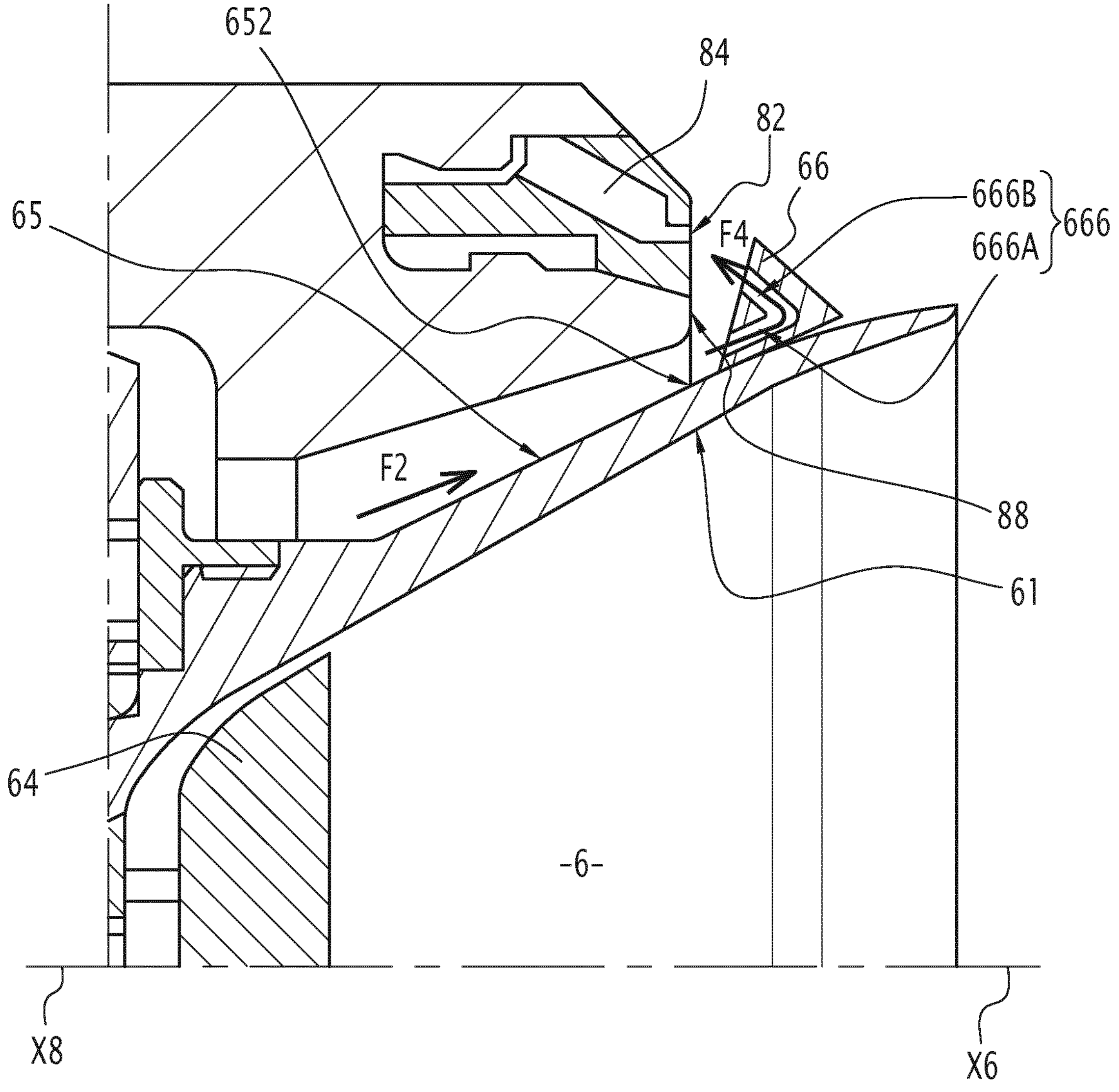
FIG. 6 is a view analogous to FIG. 5 for a spraying apparatus according to a second embodiment of the invention.

In the second and third embodiments of the invention shown in FIGS. 5 and 6, the elements similar to those of the first embodiment bear the same references. In what follows, only what distinguishes these embodiments from the first embodiment is described.

In the embodiment of FIG. 6, the deflector 66 is arranged with channels 666 that each include a first branch 666A generally parallel to the portion 652 of the outer radial surface 65 of the bowl 5 in the vicinity of the deflector 66 and a portion 666B connected to the portion 666A and directed toward the crown 88.

Thus, a flow of cleaning product as represented by arrow F2 in FIG. 6 can enter the various channel portions 666A and be redirected through the channel portions 666B to the crown 88 which can thus be effectively cleaned. In FIG. 6, arrow F4 shows the path of the cleaning product within the deflector 66 and its change in direction within a channel 666.

Figure 7:
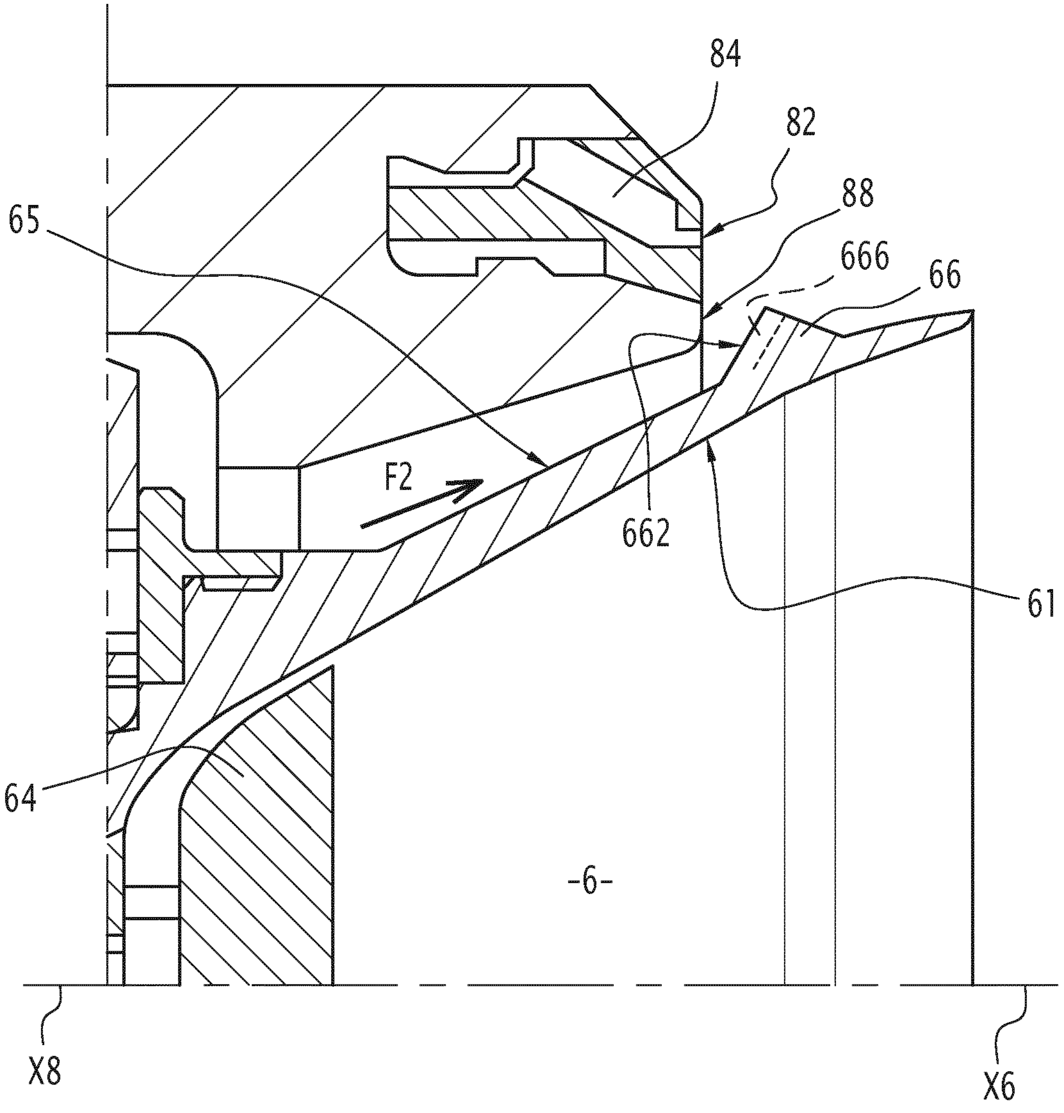
FIG. 7 is a view similar to FIG. 5 for a spraying apparatus conforming to a third embodiment of the invention.

In the third embodiment shown in FIG. 7, open channels 666 are formed by notches on the upstream surface 662 of the deflector 66, which is defined as in the first embodiment.

Advantageously, the channels 666 are evenly distributed around the axis X6.

The number and distribution of the channels 666 of the second and third embodiments may be chosen according to the number and distribution of the outlet ports 82. However, this is not mandatory.

The channels 666 may be characterized by their diameter, which in practice is between 0.1 and 3 mm, preferably between 0.5 and 2 mm. If the channels are not circular in cross section, their largest transverse dimension is between 0.1 and 3 mm, preferably between 0.5 and 2 mm.

The channels 666 are also characterized by their angular orientation with respect to the axis of rotation X8 and whether or not they may have an ortho-radial component with respect to that axis. In other words, the channels 666 are divergent toward the ports 82 and may impart a vortex motion to the flow F2+F4 of cleaning product.

In the examples shown in the Figures, the deflector 66 is integral with the body 60 of the bowl 6 that forms the inner 61 and outer 65 radial surfaces. However, in a variant, the deflector 66 may be attached to the bowl 6.

As contemplated above, in particular, with the geometry of the first and third embodiments, the deflector 66 may be formed by a strip of metal deposited on the surface 65 in the form of a weld or braze seam.

In the second and third embodiments, the channels 666 may be machined into or onto the deflector 66 before or after it is mounted on the bowl 6, when the deflector is attached to the bowl.

The invention is described above in the case where all the flow represented by arrow F2 is diverted by the deflector 66 toward the crown 88. In a variant, only a portion of this flow may be directed toward this crown, the remainder of the flow continuing to progress toward the edge 63, thus allowing the portion 654 of the outer radial surface 65, positioned axially between the deflector 66 and the edge 63, to be cleaned in passing, independently of the action of the skirt air as contemplated above with reference to FIG. 3.

In a variant, the deflector may be interrupted locally to facilitate the flow of cleaning product to the surface portion 654, independent of the action of the shaping air.

In practice, the supply of cleaning product to the surface 65 may occur from within the bowl, through the bowl. The inner volume of the bowl is supplied with cleaning product, in the vicinity of the deflector 64, and the body 60 and pierced with channels for the circulation of the cleaning product to the surface 65. As mentioned above, the cleaning product supply can be arranged to open onto the outer radial surface 65 of the bowl and be diverted by the deflector 66, as shown in FIGS. 2 and 3. In a variant, the cleaning product supply opens onto the radial outer surface 65 of the bowl, enters the channels 666 of the deflector 66 and leaves by centrifugal effect, as shown in FIGS. 6 and 7. According to another variant not shown, the cleaning product supply opens directly into the channels 666 of the deflector 66. In addition, provision may be made to use the same source of cleaning product to clean the surfaces 61 and 65, by means of two cleaning product supply lines, including the injector 10. In a variant, a restriction may be placed in the path of the cleaning product leaving the injector, so as to limit the flow rate of the cleaning product flowing to the inner radial surface 61, to the extent that a portion of the flow is driven to the outer radial surface 65, which it thereby cleans.

The embodiments and variants contemplated above may be combined to generate new embodiments of the invention.

The invention claimed is:

1. A bowl for spraying a coating product, intended to be integrated into a rotary spraying apparatus for a coating product, the rotary spraying apparatus comprising a turbine to drive the bowl about an axis of rotation and a body that defines the axis of rotation and which comprises orifices for ejecting shaping air arranged in a crown, the bowl comprising:

- a body centered on an axis, comprising:
  - an inner radial surface for distributing the coating product to a spraying edge; and
  - an outer radial surface, radially surrounding said inner radial surface, wherein a deflector integral with the bowl protrudes only out of the outer radial surface as a triangular protrusion with two concave surfaces and directs, at least partially, a flow of cleaning product flowing along the outer radial surface towards the spraying edge, towards a front face of the body of the rotary spraying apparatus where the orifices are located.

2. The bowl according to claim 1, wherein said deflector defines, in a plane radial to the axis of rotation and with said outer radial surface upstream of said deflector, a dihedral with an angle at an apex between 10° and 170°.

3. The bowl according to claim 1, wherein said deflector is located, along said outer radial surface, at a non-zero distance from the spraying edge.

4. The bowl according to claim 1, wherein said deflector comprises channels that are inclined in an ortho-radial direction with respect to the axis of rotation.

5. A rotary spraying apparatus for a coating product comprising:

- the bowl according to claim 1, rotating about the axis of rotation;
- the turbine for rotating said bowl about the axis of rotation;
- the body which defines the axis of rotation, comprising the orifices for ejecting shaping air for a cloud of droplets of coating product discharged from the spraying edge of said bowl, the orifices being arranged on the crown of said body of the rotary spraying apparatus.

6. The rotary spraying apparatus according to claim 5, wherein the deflector of the outer radial surface of said bowl is located, along the axis of rotation and according to a direction of flow of the coating product towards the spraying edge of said bowl, upstream of an orthogonal projection of the crown on the axis of rotation.

7. The rotary spraying apparatus according to claim 5, wherein said deflector is situated, along the axis of rotation and in a direction of flow of the coating product towards the spraying edge of said bowl, downstream of an orthogonal projection of the crown on the axis of rotation.

8. The rotary spraying apparatus according to claim 5 wherein the crown forms the front face of said body of the rotary spraying apparatus and is perpendicular overall to the axis of rotation.

9. A method of cleaning a rotary spraying apparatus, comprising:

providing the rotary spraying apparatus according to claim 5;

directing the flow of cleaning product towards the outer radial surface of the bowl of the rotary spraying apparatus, while the bowl is rotating; and allowing the cleaning product to flow at least up to a level of the deflector of the outer radial surface of the bowl of the rotary spraying apparatus and, at least partially, in a direction of the crown of the body of the rotary spraying apparatus.

10. The method according to claim 9, wherein said allowing comprises:

a first operation during which the orifices are not supplied with pressurized air; and a second operation during which the orifices are supplied with pressurized air.

11. The bowl according to claim 2, wherein the angle at the apex of the dihedral is between 45° and 135°.

12. The bowl according to claim 3, wherein the non-zero distance is greater than 5 mm.

13. The bowl according to claim 3, wherein the non-zero distance is greater than 10 mm.

* * * * *